Figure 1:
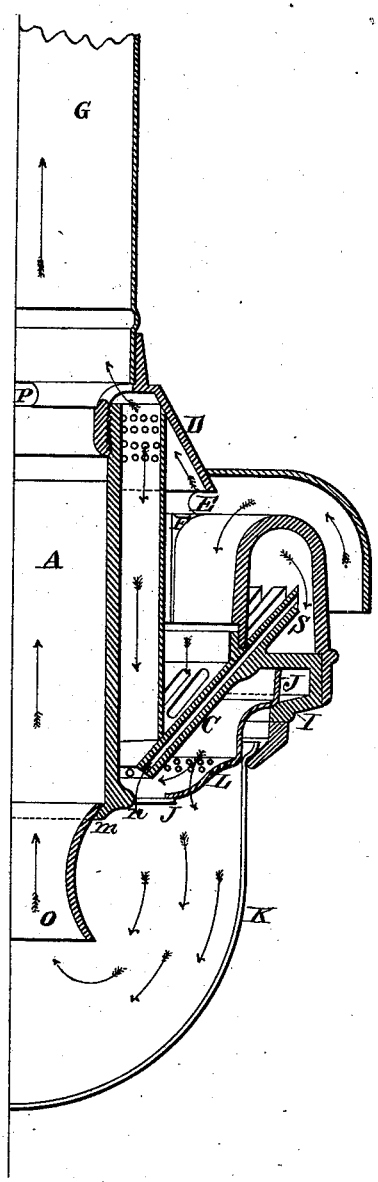

(No Model.)  3 Sheets—Sheet 1.

T. GORDON.
REGENERATIVE GAS BURNER.

No. 374,058.  Patented Nov. 29, 1887.

Witnesses
C. Fred. Hallet
Vernon M. Dorsey

Inventor
Thomas Gordon.
By his Attorney C. S. Whitman

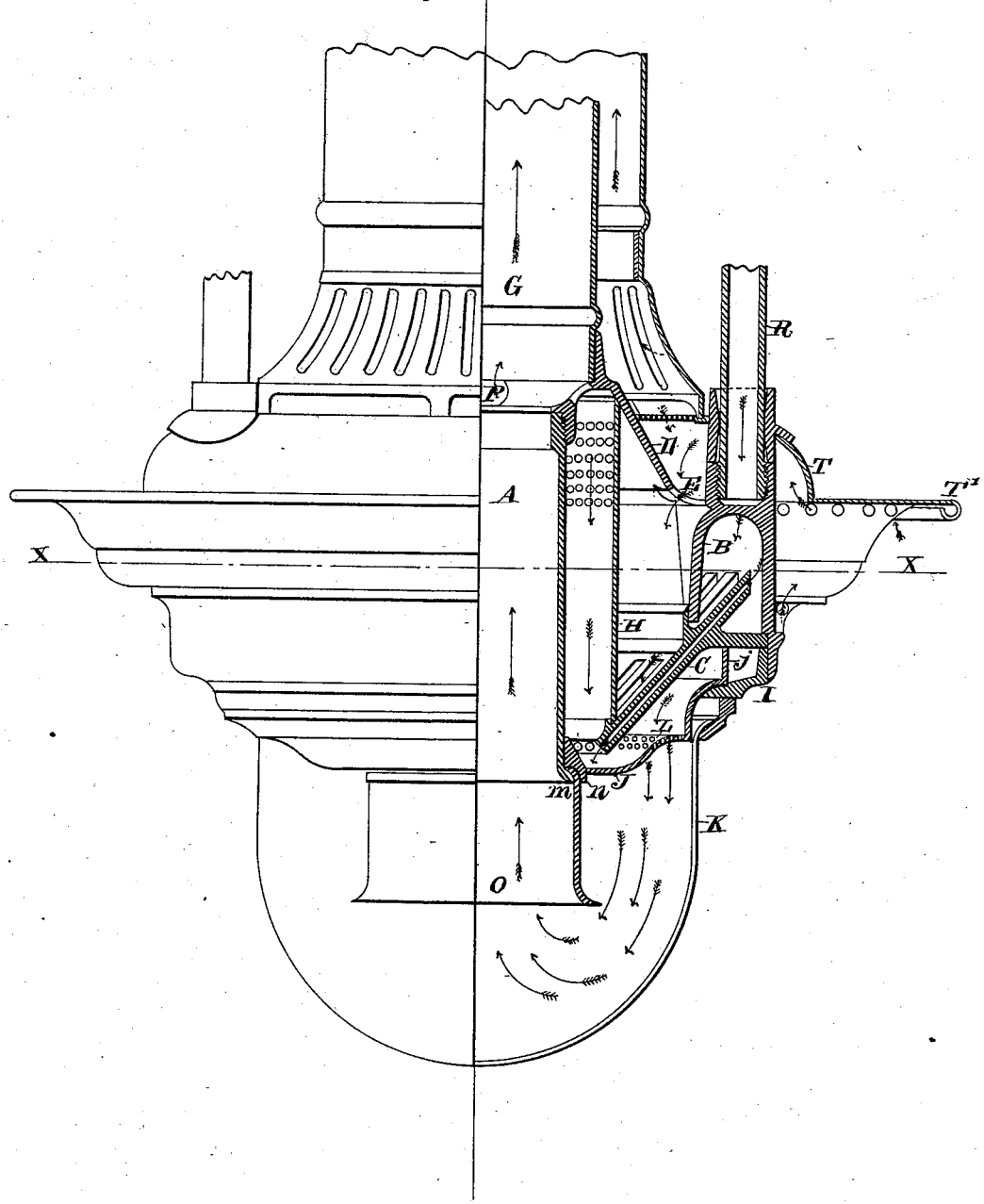

(No Model.) 3 Sheets—Sheet 3.

T. GORDON.
REGENERATIVE GAS BURNER.

No. 374,058. Patented Nov. 29, 1887.

Witnesses
C. Fred. Hellert
Vernon M. Dorsey

Inventor
Thomas Gordon
By his Attorney C. S. Whitman

United States Patent Office.

THOMAS GORDON, OF PHILADELPHIA, PENNSYLVANIA, ASSIGNOR TO THE SIEMENS LUNGREN COMPANY, OF PENNSYLVANIA.

REGENERATIVE GAS-BURNER.

SPECIFICATION forming part of Letters Patent No. 374,058, dated November 29, 1887.

Application filed January 20, 1887. Serial No. 224,927. (No model.)

*To all whom it may concern:*

Be it known that I, THOMAS GORDON, a citizen of the United States, residing at Philadelphia, in the county of Philadelphia and State of Pennsylvania, have invented certain new and useful Improvements in Regenerative Gas-Burners; and I do hereby declare the following to be a clear, full, and exact description of the invention, such as will enable others skilled in the art to which it appertains to make and use the same.

My invention relates to that class of lamps known as "regenerative lamps," for a certain form of construction of which Letters Patent of the United States No. 345,499 were granted to me July 13, 1886, and for certain modifications in which I have filed an application for Letters Patent November 1, 1886.

My invention consists in certain modifications of the details of the construction shown in said papers and certain novel combinations of parts, which will be hereinafter described, and designated in the claims.

I construct the lamp as follows: An annular burner, consisting, preferably, of a number of small tubes or passages descending at an angle toward a common center from an annular gas-chamber into which the combustible gas passes, has within its central space a regenerative chamber, which communicates at the top with a passage of larger diameter leading to the chimney. This regenerative chamber serves for the upward passage of the products of combustion, which pass into it from the bottom of the flame at its lower end and are drawn upward through it by the draft. On the outside of the central regenerative chamber and inside of the burner is a second chamber, open at its lower end and having small openings at its upper end connecting with the chimney and openings through its outer wall, through which air gains entrance to said chamber, which becomes heated by conduction and radiation from the heat given off from the central chamber and passes downward through the chamber on its way to the inner surface of the flame of the burner. Surrounding this air-chamber, and between its outer wall and the inner wall of the gas-chamber, is a chamber which communicates at its upper end with passages leading to the outer atmosphere and to the inner air-chamber, and at its lower end communicates with the spaces or openings between the gas-tubes, through which air is allowed to pass downward and is carried to the outer surfaces of the flame. As the flame is drawn inward directly over the bottom of the inner chamber, it is necessary to carry the latter downward to such a distance as to afford the desired length of flame, and for this purpose I fit into the lower end of the central chamber, which terminates at a short distance below the burner, a separate thimble of refractory material and of a certain shape, which will readily withstand the high heat of the flame at that point and that can be renewed when it becomes deteriorated.

In order to produce the requisite upward draft in the central chamber I form in the passage leading therefrom to the chimney a number of holes, as described above, of sufficient capacity to admit a part of the products of combustion, which on the first lighting of the lamp flow upward through the middle chamber. By this arrangement, when the lamp is first lighted, a part of the products of combustion, mixed with air from the middle chamber, will pass upward through the chimney and impart heat thereto, by which means a draft will be induced in the central chamber, and after a short interval of time this draft will be sufficiently powerful to draw all the products of combustion downward around the lower end and upward through the central chamber.

The central flue or passage may consist of two separate pieces, as described above, with the refractory thimble resting on an inward projection of the surface of said chamber, or it may consist of three separate pieces, as follows: The chamber may have upon its outer surface, at the lower end, two rims or ledges of different diameters, the lower one supporting the refractory thimble, which in this case should be made bell-mouthed at its lower end and having a ledge on its inner surface at the upper end, and a deflector should be provided, which should rest upon the upper ledge and surround the upper end of the refractory thimble, or the whole flue or passage may consist of a single piece of refractory material, its outer surfaces having the forms of either of the above-described arrangements, and so attached to the lamp as to be readily removed for repairs or renewal. The burner-tubes extend into the gas-chamber and take their supply of gas from the center of the chamber or from that side farthest removed from the regenerative chamber, and this is so arranged as to prevent the fouling of said tubes. The central regenerative chamber of the lamp may be instantaneously removed, and after having been thus removed may be replaced with facility, it being one of the principal objects of my invention to construct a lamp having a regenerative chamber and flame-deflector which may be detached and replaced without in any way disturbing or disarranging the other parts of the lamp. In this form of construction the gas-chamber is made in two parts. To the upper one are attached the gas-supply pipes and the globe-holder, while to the lower half are attached the gas-tubes of the burner and the outside flame-deflector. This lower half of the burner may, however, be cast all in one piece, leaving the spaces for the supply of air to the outer surface of the flame open, and drilling through the ribs thus formed to provide the necessary passages for the gas. The outer flame-deflector is attached to the lower or tubular section of the gas-chamber in such a manner as to be instantly removable, and after having been thus removed may be replaced with facility; and this constitutes an important feature of my invention. The outer flame-deflector is perforated through its lower face between its smallest circumference and that portion which is located adjacent to the inner surface of the globe, the object of which is to provide a current of air upon the inner surface of the globe, which serves to prevent it from becoming overheated. It also aids in controlling the lower ends of the flame.

The course taken by the flames in this lamp is carefully directed by the arrangement of the flame-deflectors. The inner deflector, which is part of or may be attached to the central regenerative chamber, is arranged some distance below the outer deflector, and this arrangement causes the flame to assume a spheroidal shape, and enables me to produce a large amount of flame-surface within a comparatively small-sized globe.

The refractory thimble above described I prefer to make either bell-mouthed at its lower end when suspended from the outside of the central chamber or bell-shaped at both ends when suspended from the inside of the said chamber.

For certain applications of the lamp I shall connect the gas-supply pipes to the crown of the gas-chamber and suspend the lamp thereby, while in other cases the gas-supply may be introduced at the side of said chamber and other means provided for supporting the lamp.

Figure 3:
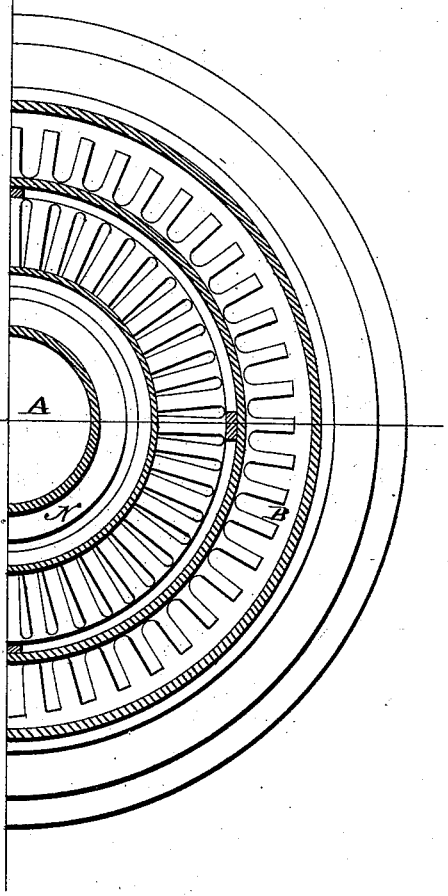
Figure 4:
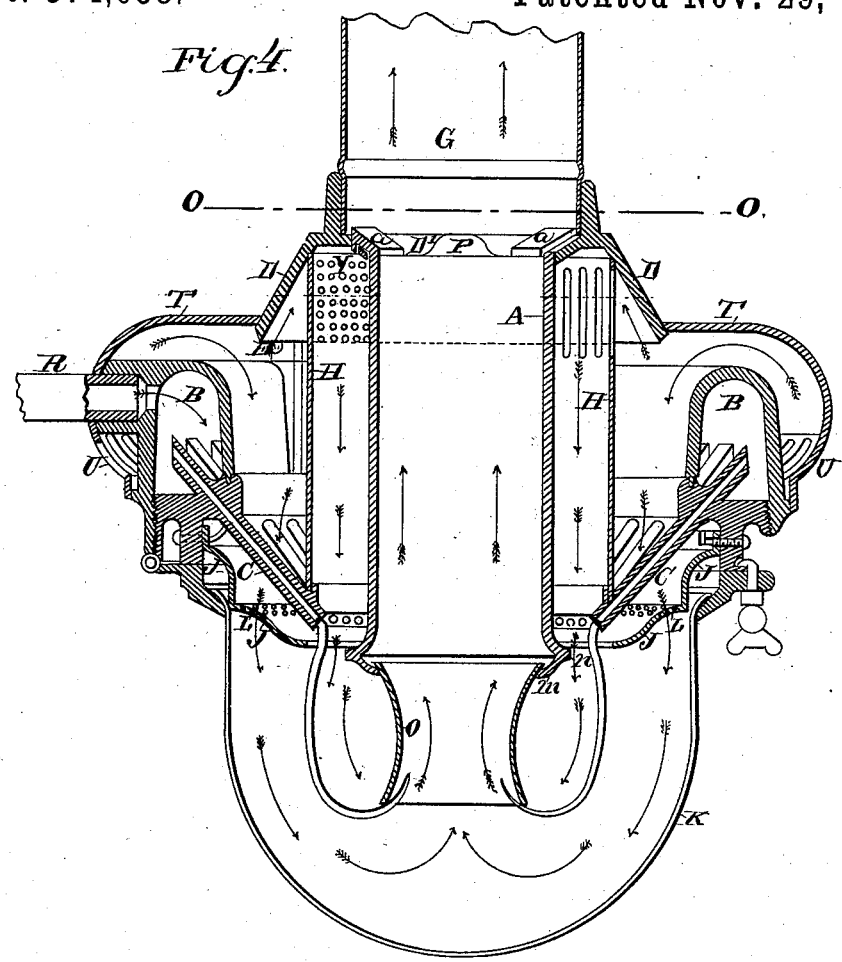
Figure 5:
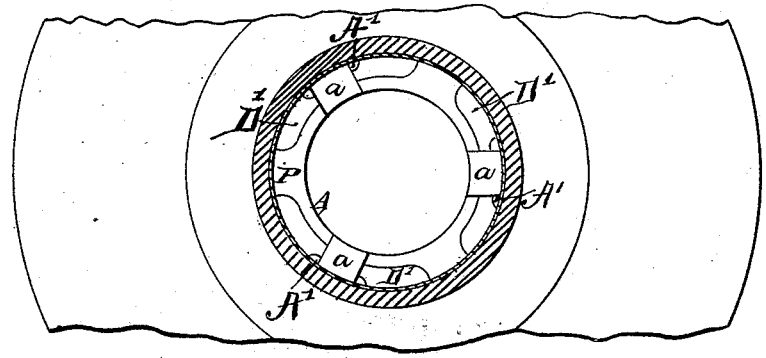

In the accompanying drawings, in which corresponding parts are designated by similar letters, Figure 1 is a vertical half-section of a lamp, showing the relation of all the parts necessary to produce a working-lamp. Fig. 2 is a half-section and elevation of a lamp when provided with an ornamental casing, and also showing the arrangement by which the gas-supply may be introduced. Fig. 3 is a horizontal section on the line $x\ x$ of Fig. 2, and Figs. 4 and 5 illustrate the methods of supporting the central flue and the outside flame-deflector and globe-holder. Fig. 5 is a broken horizontal cross-section on line $o\ o$ of Fig. 4.

In the drawings, A represents the central passage or flue, which may be connected with the lamp in any suitable manner, provided it is so combined therewith as to be readily detached and removed.

One of the methods which I have used for attaching and detaching the central flue is best illustrated in Figs. 4 and 5.

In Fig. 4, P designates the ports through which the heated air passes to start the draft in flue G. The projecting lugs $a$ are made of such size as to be readily passed through the ports P. A groove is cut into lugs $a$ on their lower faces, leaving a projection downward, as at Y, Fig. 4.

On the inner surface of cone D, immediately at the base of flue G, ledges D' are formed, having ports A', into which the downward projections on lugs $a$ may pass, thus securing the flue A in its position, by means of which construction it is obvious that the latter may be readily detached by lifting it from its bearings.

At the lower end of the chamber A is the removable thimble O, of refractory material, having an annular projection at its top, which rests upon the inwardly-projecting lower edge, $m$, of the chamber A, (see Fig. 4,) so that it may be readily detached when the latter is removed from the lamp; and for certain sizes of lamps I shall construct this part as follows: Around the lower edge of the flue A a ledge is formed to support the removable thimble of refractory material, and resting upon the upper edge of the same may be placed the flame-deflector $n$, both of which may be readily detached from the flue A when the latter is removed from the lamp. Around the lower end of the flue A is arranged the plate J, which has in its face perforations L. It may be secured in place either by a rim, I, connecting with the outer wall of the gas-chamber, as in Fig. 2, or by a bayonet-joint, as in Fig. 4. In either case it is readily removable.

The gas-chamber B is located so that all parts thereof may be exposed to air of low temperature. Around and above it is placed hood T, which directs the cold air against its outer surface, thus tending to prevent it from being overheated. From the base of the gas-chamber B, and descending therefrom at any suitable angle which will cause them to converge toward the central flue, A, are the tubes C, nular air-heating chamber of high temperature surrounding the central chamber, an annular air-heating chamber of lower temperature surrounding said chamber of high temperature, an annular gas-chamber surrounding said chamber of low temperature, and gas-passages, one end of which project into the annular gas-chamber and diverge toward the outer wall thereof and the other end of which converge toward the central chamber, as and for the purpose described.

7. In a regenerative gas-burner, the combination of a casing provided with ports through which a portion of the heated air passes to the chimney, a central passage through which the products of combustion pass upward, provided with lugs of such size as to be readily passed through said ports, an annular chamber surrounding the same, in which the air passing downward is heated to a high temperature, an annular heating-passage surrounding the said chamber, in which the air passing downward is heated to a lower temperature, an annular gas-chamber surrounding the said chamber of lower temperature, provided with downwardly-converging gas-passages, and an inclosing globe or shade, as and for the purpose described.

8. In a regenerative gas-burner, the combination of a casing provided with ports through which a portion of the heated air passes to the chimney, a removable central regenerative chamber through which the products of combustion pass upward, provided with lugs which pass through the said ports and lodge in holes cut for their reception in the casing, an annular chamber surrounding the same, in which the air is highly heated, an annular passage surrounding the said air-heating chamber, in which the air passing downward is heated to lower temperature, an annular gas-chamber surrounding the said chamber of lower temperature, provided with converging gas-passages, and an inclosing globe or shade.

9. In a regenerative gas-burner, the combination of a removable central passage having a flame-deflector which forms a part of its lower end, an annular air-heating chamber of high temperature surrounding the same, an annular air-heating chamber of lower temperature surrounding the said chamber of high temperature, an annular gas-chamber surrounding the chamber of lower temperature, provided with converging gas-passages, a casing provided with ports through which a portion of the heated air passes to the chimney, and an inclosing globe or shade, as and for the purpose described.

10. In a regenerative gas-burner, the combination of a casing provided with ports through which a portion of the heated air and products of combustion pass to the chimney, the chimney situated above the said ports, a central passage provided with lugs which rest in or upon the said casing, and the burner, whereby an automatic reversal of the flame is effected at the moment of lighting.

In testimony whereof I affix my signature in presence of two witnesses.

THOS. GORDON.

Witnesses:
FRANCIS S. BROWN,
HENRY A. McMURROW.

which extend into the gas-chamber B, so that they may receive their supply of gas from the coolest part of the chamber.

Located between the flue A and the inner wall of the chamber B is a cylinder, H, perforated at its upper end to admit the air to the inner surface of the flame. It is obvious that this may be made of different shapes, and I do not limit myself to a cylinder. The ultimate objects thereof are to prevent the escape of heat to the walls of the gas chamber, as well as to confine said heat and carry it back as quickly as possible to the flame, and for certain gases its outer surface may be coated with non-conducting material below the perforations.

The flue G is secured to the rim cast on cone D in any suitable manner, and for ornamental fixtures a flue-pipe may surround the same and a column of air pass up between them to prevent discoloration of outer flue-pipe.

Operation: When the lamp is burning normally, gas enters the chamber B through the pipes R, and from thence passes downward through the series of tubes C to the flame, while the air to support combustion enters through the perforations U in the outer casing, T, passes upward between the casing T and the outer wall of the gas-chamber B, and thence principally downward, as indicated by the arrows, around the gas-chamber B and the gas-tubes C to the flame. A small portion, however, will pass upward through the holes P to the chimney G, and another small column will pass downward through the perforations L in the deflector surrounding the flame, to prevent overheating of the globe K. When the gas is first lighted at the lips of the burner-tubes C, the globe is closed, and the heat produced by the flame will at first rise and pass through the perforations P into the chimney-flue G, which will produce an upward draft in the latter greater than the openings P can supply, and a suction will be produced in the flue A, which will cause the flame to turn down into the globe K and envelop the base of the flue A and the refractory flame-thimble O. The products of combustion will then pass upward through the walls of the flue A and impart heat to the walls thereof, which heat, being taken up and carried back to the flame, will add to the temperature thereof and increase its brilliancy.

Having thus described my invention, I claim and desire to secure by Letters Patent—

1. In a regenerative gas-burner, the combination of a central passage through which the products of combustion pass upward, an annular chamber surrounding the same, in which the air passing downward is heated to a high temperature, an annular heating-passage surrounding the said chamber, in which the air passing downward is heated to a lower temperature, an annular gas-chamber surrounding the said chamber of lower temperature, gas tubes or passages having openings or paces through which the air passes downward from the chamber of lower temperature, and an inclosing globe or shade, as and for the purpose described.

2. The combination of the central passage, the chamber surrounding the same, in which the air is allowed to attain a high temperature, the air-chamber surrounding the said chamber of high temperature, in which the air is heated to a lower temperature than in the first-mentioned chamber, and the annular gas-chamber communicating near its lower end with gas-passages which converge toward the chamber in which the air is heated to a high temperature, the ends of the said gas-passages projecting into said chamber, substantially as described.

3. In a regenerative gas-burner, the combination of a removable central chamber through which the products of combustion pass upward, a removable extension of the same, projecting down below the burner to such a depth as to afford the requisite length of the flame, an annular air-heating chamber of high temperature surrounding the removable central chamber, an annular air-heating chamber of lower temperature surrounding the said chamber of high temperature, an annular gas chamber surrounding the chamber of lower temperature, provided with converging gas-passages, and an inclosing globe or shade, as and for the purpose described.

4. In a regenerative gas-burner, the combination of a removable central chamber through which the products of combustion pass upward, a removable extension of the same projecting down below the burner to such a depth as to afford the requisite length of the flame, an annular deflector surrounding the flame and directing currents of air against the outer surface thereof, an annular air-heating chamber of high temperature surrounding the removable central chamber, an annular air-heating chamber of lower temperature surrounding the said chamber of high temperature, an annular gas-chamber surrounding the chamber of lower temperature, provided with converging gas-passages, and an inclosing globe or shade, as and for the purpose described.

5. In a regenerative gas-burner, the combination of a central chamber through which the products of combustion pass upward, provided at its upper end with openings through which the heated air and products of combustion pass inward for the purpose of creating an upward draft in said chamber, an annular air-heating chamber of high temperature surrounding the central chamber, an annular air-heating chamber of lower temperature surrounding said chamber of high temperature, an annular gas-chamber surrounding the chamber of lower temperature, provided with converging gas-passages, and an inclosing globe or shade, as and for the purpose described.

6. In a regenerative gas-burner, the combination of a central chamber through which the products of combustion pass upward, an an-